US010425463B2

(12) United States Patent
Michael et al.

(10) Patent No.: US 10,425,463 B2
(45) Date of Patent: *Sep. 24, 2019

(54) ASYNCHRONOUS MESSAGE PASSING (71) Applicant: Google LLC, Mountain View, CA (US)

(72) Inventors: David A. Michael, Louisville, CO (US); Darin Fisher, San Carlos, CA (US); Brett E. Wilson, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/846,138

(22) Filed: Sep. 4, 2015

(65) Prior Publication Data

US 2016/0050253 A1    Feb. 18, 2016

Related U.S. Application Data

(63) Continuation of application No. 13/428,970, filed on Mar. 23, 2012, now Pat. No. 9,128,702.

(51) Int. Cl.
*H04L 9/08* (2006.01)
*G06F 9/44* (2018.01)
(Continued)

(52) U.S. Cl.
CPC ............... *H04L 67/02* (2013.01); *G06F 8/31* (2013.01); *G06F 9/44526* (2013.01);
(Continued)

(58) Field of Classification Search
CPC ......... H04L 67/02; H04L 67/10; H04L 67/34; G04L 63/20; G06F 9/31; G06F 9/545;
(Continued)

(56) References Cited

U.S. PATENT DOCUMENTS 7,929,523 B2    4/2011   Shenfield et al.
8,001,232 B1 *  8/2011   Saulpaugh .............. G06F 9/465
                                                              709/203
(Continued)

OTHER PUBLICATIONS

'Mozilla developer center' [online]. "Mozilla Developer Preview Now Available With Out-of-Process Plugins," 2010, [retrieved on May 24, 2012]. Retrieved from the Internet: URL: < https://developer.mozilla.org/devnews/index.php/2010/03/03/Mozilla-developer-preview-now- >. 3 pages.

(Continued)

*Primary Examiner* — Lewis A Bullock, Jr.
*Assistant Examiner* — Mohammad H Kabir
(74) *Attorney, Agent, or Firm* — Botos Churchill IP Law LLP (57) ABSTRACT

This specification describes technologies relating to software execution. A computing device includes a processor. An operating system includes an execution environment in which applications can execute computer-specific commands. A web-browser application includes a scripting environment for interpreting scripted modules. The web-browser application further includes a native environment in which native modules can execute computer-specific commands. The web-browser application further includes an interface between the scripting environment and the native environment. The interface includes functions to asynchronously pass data objects by value, from one of the scripting environment and the native environment, to the other of the scripting environment and the native environment.

19 Claims, 5 Drawing Sheets

(51) Int. Cl.
*G06F 15/16* (2006.01)
*H04L 29/08* (2006.01)
*G06F 8/30* (2018.01)
*G06F 9/54* (2006.01)
*G06F 9/445* (2018.01)
*G06F 9/455* (2018.01)
*H04L 29/06* (2006.01)

(52) U.S. Cl.
CPC .......... *G06F 9/45512* (2013.01); *G06F 9/544* (2013.01); *G06F 9/545* (2013.01); *H04L 63/20* (2013.01); *H04L 67/10* (2013.01); *H04L 67/34* (2013.01)

(58) Field of Classification Search
CPC ... G06F 9/44525; G06F 9/45512; G06F 9/544
See application file for complete search history.

(56) References Cited

U.S. PATENT DOCUMENTS

| | | | | |
|---|---|---|---|---|
| 8,646,020 | B2* | 2/2014 | Reisman | G06F 17/30873 725/110 |
| 9,117,002 | B1* | 8/2015 | Jenkins | G06F 17/30899 |
| 9,363,134 | B1* | 6/2016 | Goodspeed | H04L 29/06 |
| 9,465,837 | B1* | 10/2016 | Ross | G06F 17/30424 |
| 2001/0049749 | A1 | 12/2001 | Katsuragi et al. | |
| 2002/0008703 | A1* | 1/2002 | Merrill | G06F 8/00 345/473 |
| 2003/0033443 | A1 | 2/2003 | Igotti | |
| 2005/0193380 | A1* | 9/2005 | Vitanov | G06F 9/451 717/143 |
| 2006/0039401 | A1* | 2/2006 | Shenfield | H04L 51/14 370/462 |
| 2006/0161982 | A1* | 7/2006 | Chari | G06F 21/53 726/23 |
| 2006/0225053 | A1 | 10/2006 | Lakshman et al. | |
| 2007/0100967 | A1 | 5/2007 | Smith et al. | |
| 2008/0147671 | A1* | 6/2008 | Simon | G06F 17/30899 |
| 2010/0014437 | A1 | 1/2010 | Wang et al. | |
| 2010/0153692 | A1* | 6/2010 | Kota | G06T 11/20 712/222 |
| 2010/0165392 | A1 | 7/2010 | Yabe | |
| 2011/0085667 | A1* | 4/2011 | Berrios | G06F 21/445 380/282 |
| 2011/0093568 | A1* | 4/2011 | Thomas | H04L 65/4007 709/219 |
| 2011/0190938 | A1* | 8/2011 | Ekelund | G05B 19/409 700/264 |
| 2012/0020466 | A1 | 1/2012 | Dunsmuir | |

OTHER PUBLICATIONS

'Mozilla Developer Network' [online]. "Functions," 2012, [retrieved on May 24, 2012]. Retrieved from the Internet: URL: <https://developer.mozilla.org/en/Core_JavaScript1.5_Guide/Functions#Defining_Functions>. 14 pages.

'Mozilla Developer Network' [online]. "Scripting plugins," 2012, [retrieved on May 24, 2012]. Retrieved from the Internet: URL: <https://developer.mozilla.org/En/Gecko_Plugin_API_Reference:Scripting_plugins>. 5 pages.

* cited by examiner

ASYNCHRONOUS MESSAGE PASSING

CROSS-REFERENCE TO RELATED APPLICATIONS

This application is a continuation application of and claims priority to U.S. application Ser. No. 13/428,970, filed on Mar. 23, 2012, the entire contents of which are hereby incorporated by reference.

BACKGROUND

The present disclosure relates to software execution.

A browser plugin is a separate software module that modifies the browser interface and the browser behavior. Conventional browsers are configured to provide a plugin interface for runtime support of plugins. A browser can expose a subset of its capabilities to be used directly at runtime by its supported plugins. Netscape Plugin Application Programming Interface (NPAPI) is an example of a conventional browser plugin interface used by many web browsers.

SUMMARY

This specification describes technologies relating to software execution.

A web-browser or other application can interpret scripted modules and execute native modules in a managed environment. To facilitate communication between the scripted modules and the native modules, an interface of the web-browser can pass data objects between the modules.

The interface can pass the data objects by value so that sending the data object creates a copy. As a result, the sending and receiving modules will both have independent copies of the data object. The interface can also pass the data objects asynchronously. As a result, the sending and receiving modules may be timed independently and the sending module does not need to wait for the receiving module to accept the data object before continuing operation.

In general, one aspect of the subject matter described in this specification can be embodied in a system that includes a computing device that includes a processor. The system further includes an operating system that includes an execution environment in which applications can execute computer-specific commands. The system further includes a web-browser application. The web-browser application includes a scripting environment for interpreting scripted modules. The web-browser application further includes a native environment in which native modules can execute computer-specific commands. The web-browser application further includes an interface between the scripting environment and the native environment. The interface includes functions to asynchronously pass data objects by value, from one of the scripting environment and the native environment, to the other of the scripting environment and the native environment.

Implementations can include any, all, or none of the following features. The web-browser application further includes a scripted module interpreted in the scripting environment. The scripted module is configured to asynchronously send a first data object, through the interface, to the native module by value without halting interpretation of the scripted module until the first data object is received by the native module. The scripted module is configured to asynchronously receive a second data object, through the interface, from the native module by value. A native module in the native environment is configured to asynchronously receive the first data object, through the interface, from the native module by value. The native module is configured to asynchronously send the second data object, through the interface, to the native module by value without halting execution of the native module until the second data object is received by the scripted module. The scripted module is written in a scripting language and the first data object and the second data objects are of types specified by the scripting language. The first data object and the second data object are of dictionary type. The scripted module is interpreted in a first process and the native module is executed in a second process. The data object is a serialized string. Web-browser application further includes a dictionary of values. The dictionary is available to the scripting environment and to the native environment. The data object is an index of a value of the dictionary. The functions to asynchronously pass data objects by value include functions to receive, from one of the scripting environment and the native environment, a reference to a memory location containing a data object; create a copy of the data object in a second memory location; and provide, to the other of the scripting environment and the native environment, a reference to the second memory location. The functions to asynchronously pass data objects by value include functions to: receive, from one of the scripting environment and the native environment, a data object; store the data object until the data objects are requested; and provide, to the other of the scripting environment and the native environment, the data object responsive to a request for the data object from the other of the scripting environment and the native environment. The computer-specific commands are processor-specific commands.

In general, one innovative aspect of the subject matter described in this specification can be embodied in methods that include the actions of executing, on a processor, an application's computer-specific commands in an operating system's execution environment; interpreting a scripted module in a web-browser's scripting environment; executing, on the processor, a native module's computer-specific commands in the web-browser's native environment; and asynchronously passing, from one of the scripting environment and the native environment, a data object by value from the other of the scripting environment and the native environment, from one of the scripting environment and the native environment, to the other of the scripting environment and the native environment.

The foregoing and other embodiments can each optionally include one or more of the following features, alone or in combination. The scripted module is written in a scripting language and the data object is of a type specified by the scripting language. The first data object and the second data object are of a dictionary type. The scripted module is interpreted in a first process and the native module is executed in a second process. The data object is a serialized string. Asynchronously passing the data object includes: receiving, from one of the scripting environment and the native environment, the data object; storing the data object in a library in association with an index; and providing, to the other of the scripting environment and the native environment, the index. Asynchronously passing a data object by value includes: receiving, from one of the scripting environment and the native environment, a reference to a memory location containing a data object; creating a copy of the data object in a second memory location; and providing, to the other of the scripting environment and the native environment, a reference to the second memory location.

Asynchronously passing a data object by value includes: receiving, from one of the scripting environment and the native environment, a data object; storing the data object until the data object is requested; and providing, to the other of the scripting environment and the native environment, the data object responsive to a request for the data object from the other of the scripting environment and the native environment. The computer-specific commands are processor-specific commands.

In general, one innovative aspect of the subject matter described in this specification can be embodied in methods that include the actions of executing, on a processor, an application's computer-specific commands in an operating system's execution environment; interpreting a scripted module in a web-browser's scripting environment; executing, on the processor, a native module's computer-specific commands in the web-browser's native environment; receiving, from one of the scripting environment and the native environment, a reference to a memory location containing a data object; creating a copy of the data object in a second memory location; and providing, to the other of the scripting environment and the native environment, the copy of the data object responsive to a request for the data object from the other of the scripting environment and the native environment.

Various implementations of the subject matter described here may provide one or more of the following advantages. For example, a browser may allow a native code portion of a web page to be executed in a managed environment. As such, up to date software may be dynamically delivered through web browsing. A web browser that asynchronously passes data object by value between scripted modules and native modules can permit more flexible and efficient design of both the scripted modules and native modules. For example, by passing a data object by value, an entire copy of a composite data structure may be passed. As such, each individual element of the composite data structure do not necessarily need to be passed in individual messages. Module developers may know that code in a module will not be reentered while blocked waiting for a result. As such, module developers are supported to write modules that are easier to design correctly. A native module can be prevented from causing a web page to hang during operations that take a long time to complete. For example, an interface passing a data object asynchronously can prevent a scripted module from hanging while a native module handles a very large incoming data object.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
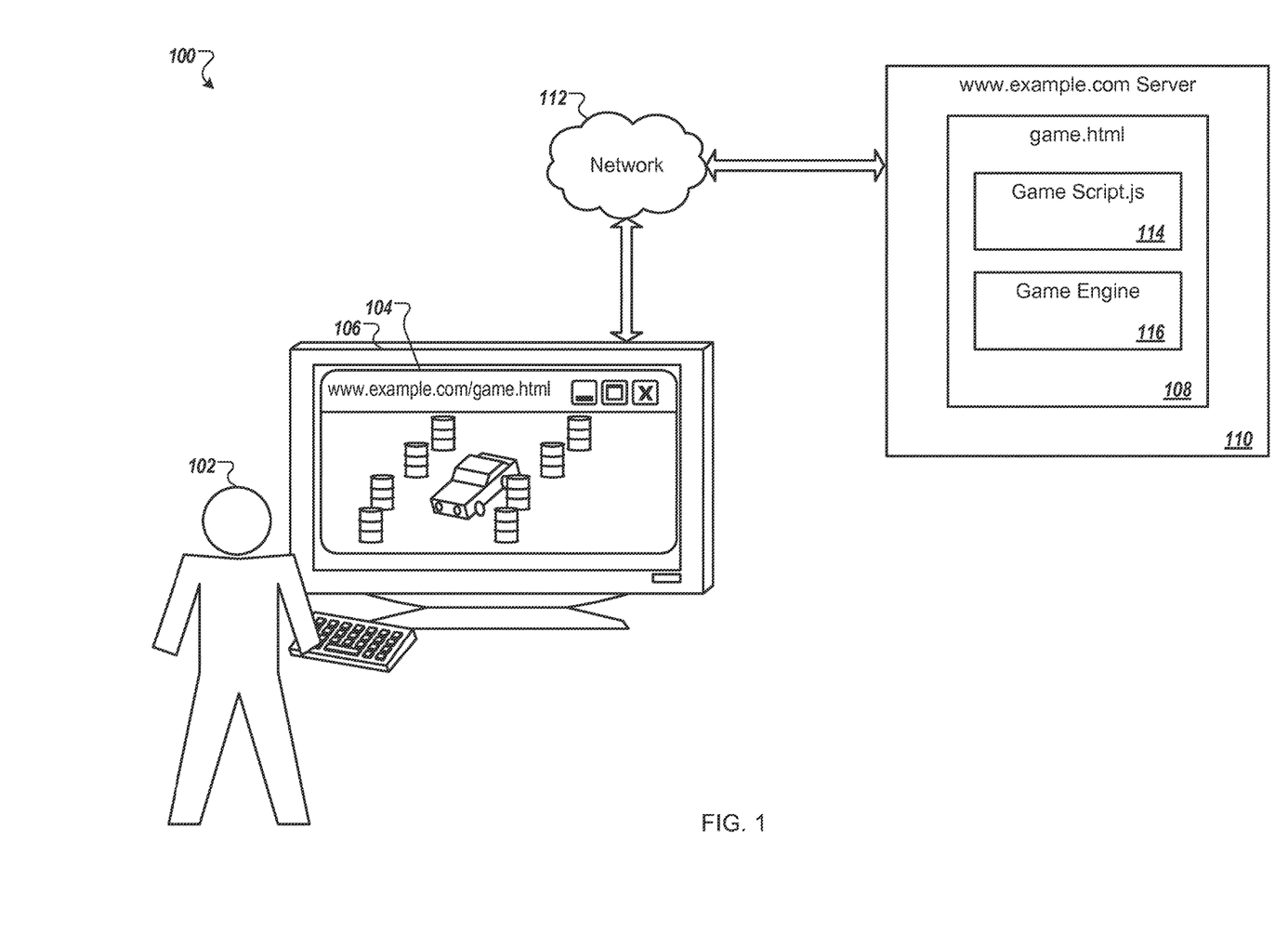
FIG. 1 is a diagram of an example of a system in which a game is served in a webpage.

FIG. 1 is a diagram of an example of a system 100 in which a game is served in a webpage. Here, a user 102 is accessing a webpage that has an embedded video game. The video game has a computationally complex three-dimensional (3D) world with moving elements that are rendered onto a two-dimensional (2D) viewing surface. To process the moving elements and the rendering, the video game has a game engine that runs native code on the user's computer, producing process throughput sufficient to play the game at a desirable speed and quality.

To load the game, the user 102 uses a web-browser 104 on a computer 106 to request a webpage 108 from a web server 110 over the network 112. In this example, the computer is a personal computer, such as a desktop or laptop. However, it will be understood that any type of computer suitable to execute an application may be used in other example. These other computers include, but are not limited to, tablet computers, phones, televisions, game consoles, game cabinets, and kiosk machines.

At the user's direction, the web-browser 104 can request the webpage 108 from the web server 110. The request is passed over the network 112, which may include any suitable wired or wireless network such as a local area network (LAN), a wide area network (WAN) and the Internet. The web server 110 can respond to the request by sending a copy of the webpage 108 back to the web-browser 104 over the network 112.

The webpage 110 in this example is a hypertext markup language (HTML) document that includes at least a scripted module 114 and a native module 116. The HTML portions of the webpage 110 define many portions of the webpage, for example, the layout of elements in the webpage when it is displayed by a web-browser. One such element of the webpage 110 is a game created by the scripted module 114. The scripted module 114 in this example is a JavaScript program, although any appropriate scripting language that is interpreted by a web-browser may be used. The scripted module 114 can handle many of the functions of the game that are not computationally complex, such as user log in, input handling, and an in-game chat with other players.

More complex or time sensitive processes like rendering a 3D world and collision detection can be handled by a game engine created using the native module 116. In this example, the native module is written in c++, although any appropriate programming language that is executed by the web-browser may be used. The native module may be, or may include, off the shelf game engines and graphics libraries, e.g., id Tech 3 or Panda30 and OpenGL or Direct3D, respectively.

When the web-browser 104 receives the webpage 108, the web-browser displays the web-page 104. Displaying the web-page 104 can include one or more of rendering the HTML, interpreting the scripted module 114, or executing the native module 116. The web-browser 104 has a number of mechanisms to protect the computer 106 from any potential malicious or erroneous functionally of the web-page 108. For the HTML rendering, user-options may be set to restrict behavior that the user 102 may not want, such as storing cookies. For the script interpreting, the scripting language or interpreter may not support potentially dangerous functionality like reading or writing to a hard drive. For the native code execution, the web-browser 104 may execute the native module 116 in a sandbox. A sandbox is a managed environment in which a subset of the computer's 106 resources are available. For example, the sandbox may have access to only one directory of disk memory, a pre-allocated memory buffer, and a subset of operating system or processor application programming interfaces (APIs).

The native module 116, and any other untrusted native code, may execute in the sandbox at, or near, the speed of native code executed outside of the sandbox. By executing the native module 116 in the sandbox, the browser can protect the rest of the computer 106 from untrusted native code without significantly diminishing the performance of the native module 116. As such, the developers of the game are able to embed games and other resources into webpages for display on a browser, and a user is able access the game without worrying that it will affect the user's computer.

Although a video game was used in this example, the system 100 can also be used for distributing other types of applications. Another example includes text-to-speech in which a scripted module sends page text to a native module and the native module generates a sound emulating a voice speaking the text, an embedded interpreter in which an arbitrary scripting language is used to create the scripted module and the native module is an interpreter for the arbitrary scripting language. Other uses include, but are not limited to, media players that are able to use hardware acceleration, remote desktop and virtualization services, computer aided drafting programs, and teleconferencing applications.

Figure 2:
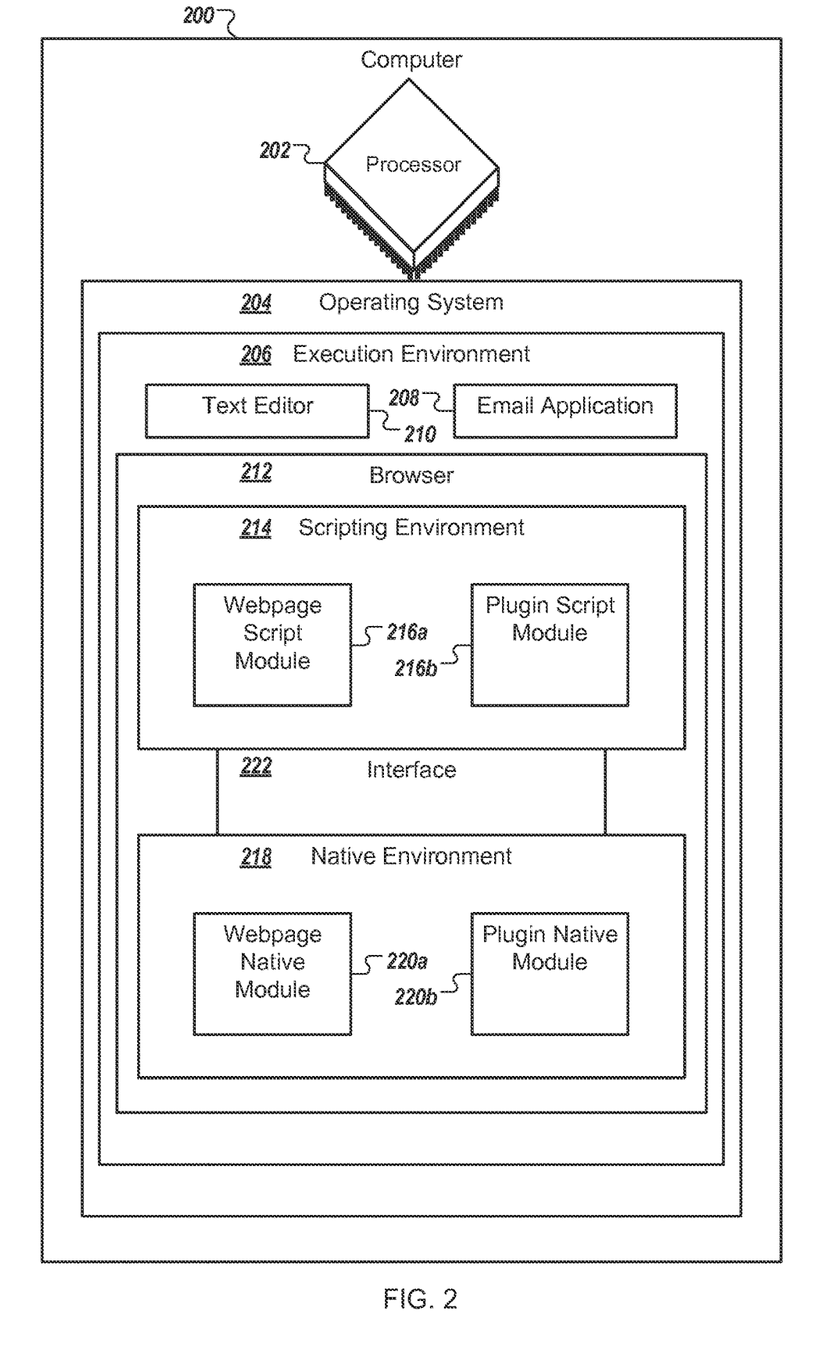
FIG. 2 is a diagram of an example of a computer system containing a browser with a native environment.

FIG. 2 is a diagram of an example of a computer system 200 containing a browser with a native environment. The computer system 200 may be used for, for example, downloading and displaying a webpage with a scripted module and a native module.

The computer system 200 includes hardware components including, but not limited to, a processor 202. The processor 202 can be configured to carry out instructions of computer programs and to perform arithmetic, logical, and input/output operations of the computer system 200. Other hardware components that may be included in the computer system 200 include, but are not limited to, main memory, disk memory, input/output hardware, and network connections (not shown for clarity). The hardware of the computer system 200 runs an operating system 204 that manages computer hardware resources and provides common services for application software. The operating system 204 may be a general purpose operating system that is compatible across a variety of hardware configurations, or the operating system 204 may be system-specific. Some of the tasks that the operating system 204 may be responsible for include, but are not limited to, user authentication, windowing, and managing network traffic.

The operating system 204 can create an execution environment 206 for executing one or more applications. The execution environment 206 can represent the conditions, policies, and tools that the operating system 204 provides to applications executing in the operating system 204. Although one execution environment 206 is shown, some computer systems 200 can create multiple execution environments 206. For example, a computer system 200 may have many users, and the computer system 200 can create an execution environment for each user. The execution environments 206 may not all be the same. For example, an execution environment 206 for an administrative user may have more permissions enabled than an execution environment 206 for a non-administrative user.

Applications that can execute in the execution environment 206 can include user-facing applications, for example, an email application 208, a text editor 210, and a browser 212. Other types of application that are not user-facing, e.g., utilities daemons, may also execute in the execution environment 206. The applications in the execution environment 206 can execute computer-specific commands. Computer-specific commands include any function, library, API, or other command that is compatible with the computer system 200, but that may not be compatible with other computer systems.

One type of computer-specific command is a processor-specific command. Processor-specific commands are commands that are associated with one or more processors. Often, the processor-specific commands are part of an instruction set associated with a processor architecture, though not always. One group of processor-specific instructions is the x86 family of instruction sets. Example processor-specific instruction in the x86 family of instruction sets include AND for a logical "and", CBW for converting a byte to a word, STI for setting an interrupt flag, and SUB for subtraction. Other example processor instruction sets include the ARM instruction set and the PowerPC instruction set.

Another type of computer-specific command is an operating system-specific command. Operating system-specific commands are commands that are associated with one or more operating systems. Operating system-specific commands are often organized into APIs related to a particular concept or task. For example, some Unix-based operating systems include an API for sockets and another API for shared memory management. Other operating system-specific commands include files and features often or always found in an operating system. For example, the /dev/random file in some Unix-based operating systems servers as a pseudorandom number generator.

Other types of computer-specific commands can exist. For example, a hardware device connected to the computer system 200 may have associated commands. The complete set of all computer-specific commands available in the execution environment can include processor-specific commands, operating system-specific commands, and other commands. The number and type of processor-specific commands may depend on the configuration of the computer system 200, as well as other factors.

A shown in FIG. 2, the browser 212 executes in the execution environment 206 and may access some or all of the computer-specific commands of the execution environment 204. The browser 212 can load and display documents, e.g., files or other data, to a user. In doing so, the browser 212 may need to render, interpret, and or execute portions of the documents. Examples of the browser 212 include, but are not limited to, file browsers, document editors, and web-browsers.

The browser 212 can create a scripting environment 214 for interpreting received scripted modules 216. The scripted modules 216 may come from a variety of sources. For example scripted module 216a may be a component of a document being loaded and displayed by the browser 212 and scripted module 216b may be a plugin of the browser 212 The scripted modules 216 are written in a scripting language e.g., JavaScript or Perl and may contain either the source code of the scripted modules 216 or bytecode created from the source code.

The browser 212 can interpret the scripted modules 216 by reading each command of source code or bytecode and performing the associated action or actions within the execution environment 206. In some implementations, the scripting language limits the types of commands that are possible. The browser 212 can enforce security policies that prevent interpretation of commands that may be malicious or unwanted. In some implementations, interpreting the scripted modules 216 is significantly slower than executing applications in the execution environment 206. Additionally, some of the commands that are not available in a scripting language may be desirable for a particular task.

The browser 212 can also create a native environment 218 for executing received native modules 220. The native modules 220 may come from a variety of sources. For example, native module 220a may be component of a document being loaded and displayed by the browser 212 and native module 220b may be a plugin of the browser 212. Native modules, as the term is used here, refers to modules that can be configured to execute computer-specific commands. The native modules 220 are written in a computer-specific programming language such as c or c++ and may contain binary data created by compiling the source code into computer-specific commands.

The native environment 218 can include a sandbox for executing the native modules 220. The sandbox may be an environment that is similar to an execution environment 206 that limits the types of computer-specific commands that are permitted. For example, the native environment 218 may intercept the commands and messages and of the native modules 220 and prevent some of the commands and messages. In some implementations, a white list of permitted commands and messages is established for a native environment 218 and only those commands and messages are permitted. In some implementations, a black list of restricted commands and messages is established for the native environment 218 and those commands are denied. Other configurations of the native environment are possible. For example, the native environment 218 may prevent cross-process messaging and may isolate software faults.

In some implementations, executing the native modules 216 in the native environment 218 may be as fast, or nearly as fast, as executing applications in the execution environment 206. This execution may be faster than interpreting scripted modules 216 in the scripting environment 214. Additionally, the computer-specific programming languages used to write native modules 220 often do not have the same limitations on the types of commands available in a scripting language.

Scripted modules 216 can be associated with one or more native modules 220 to gain access to computer-specific commands that are not available in the scripting environment 214 and/or to increase the speed of computation for a task. For example, a scripted module 216 can send data to a native module 220. The native module 202 can process the data and return the processed data to the scripted module 216.

To facilitate the passage of data between the scripting environment 214 and the native environment 218, the browser 214 can create an interface 222. The interface 222 can expose functions to the scripting environment 214 and the native environment 218 for sending and receiving data objects. In some implementations, the interface 222 may pass data by value. That is, the interface 222 may create a copy of the data as part of passing the data. By way of comparison, passing data by reference involves creating a copy of a reference to the data and passing the copy of the reference. In a pass by reference scheme, the data is not copied as part of passing the data.

Additionally, the interface 222 may pass the data asynchronously. That is, the receiving module may not need to prepare to receive data from the sending module before the sending module is able to send the data. One possible configuration of the interface 222 for asynchronously sending data by value is described with respect to FIG. 3 below.

A scripted module 216 and a native module 220 that are passing data objects may be interpreted and executed, respectively, in separate processes. The browser 212 may be executing in the execution environment 206 in two or more processes. Some of these processes are used to maintain the scripting environment 214 and the native environment 218. In some cases, each module 216 and 220 may have their own process and/or each document loaded in the browser 212 may have a process. As such, the interface 222 may be configured to pass data objects between modules in different process.

Figure 3:
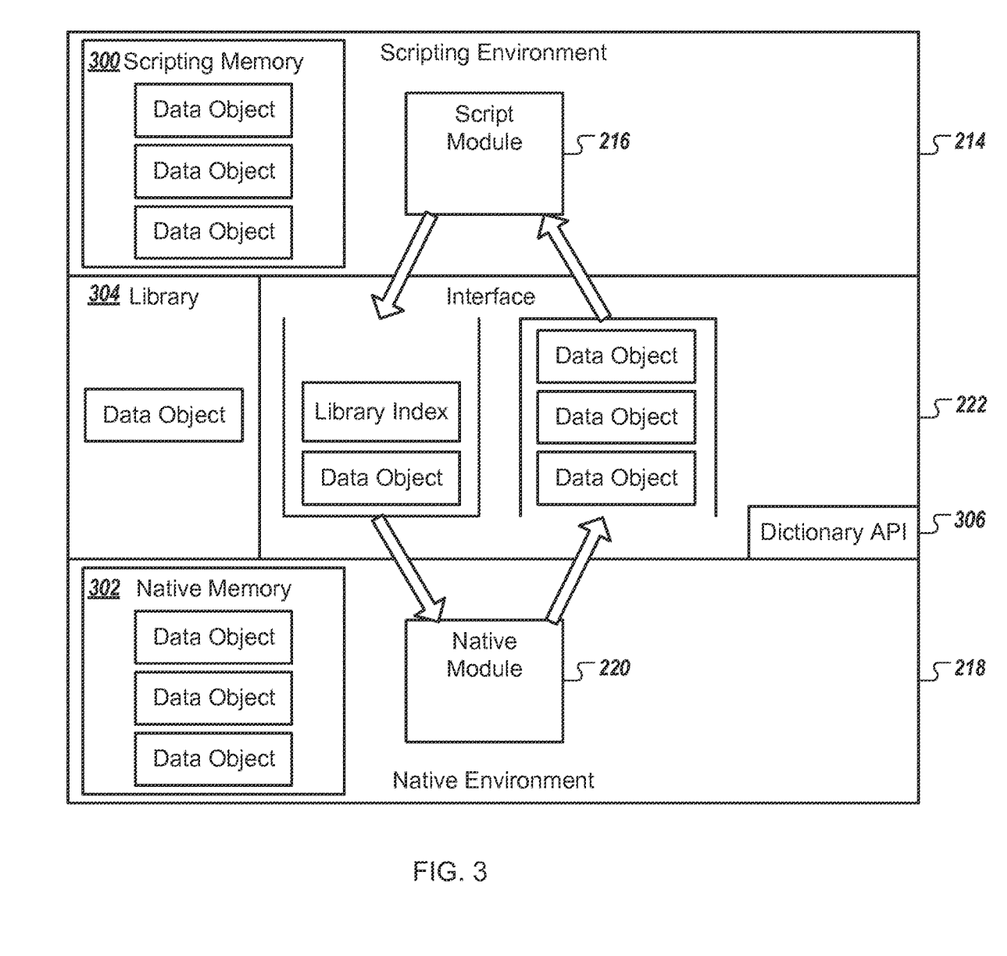
FIG. 3 is a diagram of an example of an interface between a scripting environment and a native environment.

FIG. 3 is a diagram of an example of an interface 222 between a scripting environment 214 and a native environment 218. The interface 222 is configured to pass data objects between the scripting environment 214 and native environment 218 asynchronously. Additionally, the interface 220 can be configured to pass data objects between the scripting environment 214 and native environment 218 by value. By passing data objects asynchronously, the module sending a data object does not need to wait until the data object is fully received before beginning another action. By way of comparison, passing data synchronously involves coordinating the timing of the sending module and the receiving module, resulting in halt by the sending module until the receiving module has received the data object. Additionally, the sending module and the receiving module do not need to coordinate their operations so that the sending and receiving occur at the same time. By passing data objects by value, the receiving module will receive a copy of a data object that is separate and independent of the data object sent by the sending module.

In this example configuration of the interface 220, the scripting environment 214, a scripted module 216, the native environment 218, and a native module 220 of FIG. 2 is shown. However, other configurations of these and/or other components can be used to facilitate asynchronous data passing by value.

The scripting environment 214 and the native environment 218 can be assigned a scripting memory buffer 300 and a native memory buffer 302, respectively. The scripting memory buffer 300 and native memory buffer 302 are portions of the main memory of the computer system 200 that have are allocated and managed by the operating system 204 and the browser 212. These memory buffers 300 and 302 may be the only portions of main memory to which the scripted module 216 and the native module 220 can read and write data to, for example, to segregate the scripted modules 216 and the native module 220 from the rest of the execution environment 206.

The memory buffers 300 and 302 can store data objects e.g., files, data structures, or any other data stored in main memory by the scripted module 216 and the native module 220. The data objects can be identified in the scripted module 216 and the native module 220 by references. The references can include, for example, variable names, pointers, or other appropriate identifiers.

To send a data object to a module in the other environment, the scripted module 216 or the native module 220 can provide the interface 222 with a reference to the data object to be sent. The interface 222 can create a copy of the referenced data object and add the copy to a queue between the two environments. In some implementations, the interface 222 has two queues, one for scripting environment 214 to native environment 218 data object passing, and one for native environment 220 to scripting environment 214 data object passing. In this case, every module in an environment that receives data objects from the other environment can subscribe to the same queue and pull a data object intended for that module. In some other implementations, the interface 222 has a queue for each module, and any module configured to send a data object to another module can push it to the associated queue. In still some other implementations, a module may have any number of associated queues in the interface 222. In some of these cases, a module can have different queues for different purposes such as different types of data object, data objects from different modules, or data objects intended for different uses within the module. The number and types of queues may be determined either the interface 222 or the script module 216 and the native module 220.

Once a data object is in a queue of a module, the module can pull the data object according to one or more schemes. In one scheme, the interface 222 can send an alert to the module that notifies the module that there are data objects waiting to be pulled. In another scheme, the module can poll the interface 222 to determine the state of the queue—either empty or containing data objects. The interface 222 can serve the data objects to the module in the order that they are received by the interface 222 or according to some other criteria. For example, the sending module may be permitted to give each data object a weight, and the data objects may be ordered and dequeued in order of this weight. This may permit, for example, real time or high-priority data objects to be passed faster than non-real time or low-priority data objects.

Other configurations for passing data objects by the interface 222 are possible, and it will be understood that any one of these options or any combination thereof can be used. For example, the interface 222 can place references to data objects in the queues and not create the copies of the data objects until the receiving module pulls the data object from the queue. In this configuration, for example, a more up-to-date data object can be passed by the interface 222. This may be desirable, for example, if a data object contains constantly updating or aggregate data such as an input stream.

Another configuration involves the use of a library 304. Modules may store a data object in the library 304, and the library can return a library index to the module. This library index may be a unique identifier of the data object that can be used by any module to access a copy of the data object stored in the library 304. This library index may be sent from one module to another module in the other environment using any suitable interface 222 mechanism, including the queues described above.

In some implementations, modules can or must serialize data objects to be passed by the interface 222. Serializing here refers to a reversible process of modifying a data object for transmission. Some serializing techniques involve transforming data objects into an ordered bitstream, a string, or another common data format. This data format may be the format of some data as it is used by the modules. For example, the modules may use string type data objects to store text, and serializing any object must involve changing it to a string type data object.

Additionally or alternatively, the interface 222 may pass data objects in a format that is native to one or more scripting languages or native module languages. For example, a scripting language may define an ArrayBuffer data type to represent a generic, fixed-length binary data buffer. ArrayBufferView objects may be used to represent the buffer with a specific format and to facilitate reading and writing to the buffer. The interface 222 may be configured to pass ArrayBuffers, ArrayBufferViews, and other data objects while preserving their typing.

As another example, the interface 222 may pass data objects in the format of a dictionary. The dictionary format includes a composite data structure, sometimes a hash map but other configurations are possible, that indexes each element by a string value key. By way of comparison, many other composite data structures, such as arrays, usually index each element by an ordinal value. In some implementations, the native module 220 lacks some of the functionally to use the dictionary, for example to iterate over a dictionary data object, to look up a value by key, or to discover the key strings. In some of these cases, the interface 222 may include a dictionary API to provide these and/or other functions to the native module 220.

By passing data objects asynchronously and by value, the interface 222 allows the developers of the script module 216 and the native module 220 more flexibility in design than if the data objects were only passed synchronously and by reference. For example, in the game webpage of FIG. 1, the native module 116 may be able to pass an entire copy of a pixel buffer to the scripted module 114. If the pixel buffer were to be passed by reference, the scripted module 114 may need to request the value of each pixel in separate requests. Further, the native module 116 would not have to wait for the scripting module 114 to receive the pixel buffer before beginning the process of rendering the next frame of the game.

Figure 4:
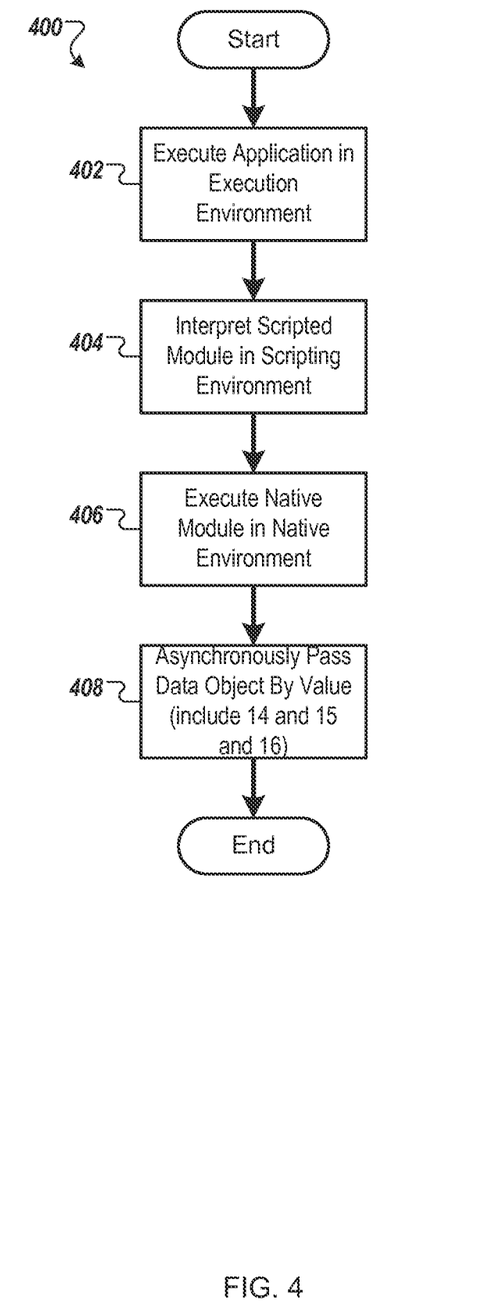
FIG. 4 is a flowchart of an example of a process for executing native code.
Figure 5:
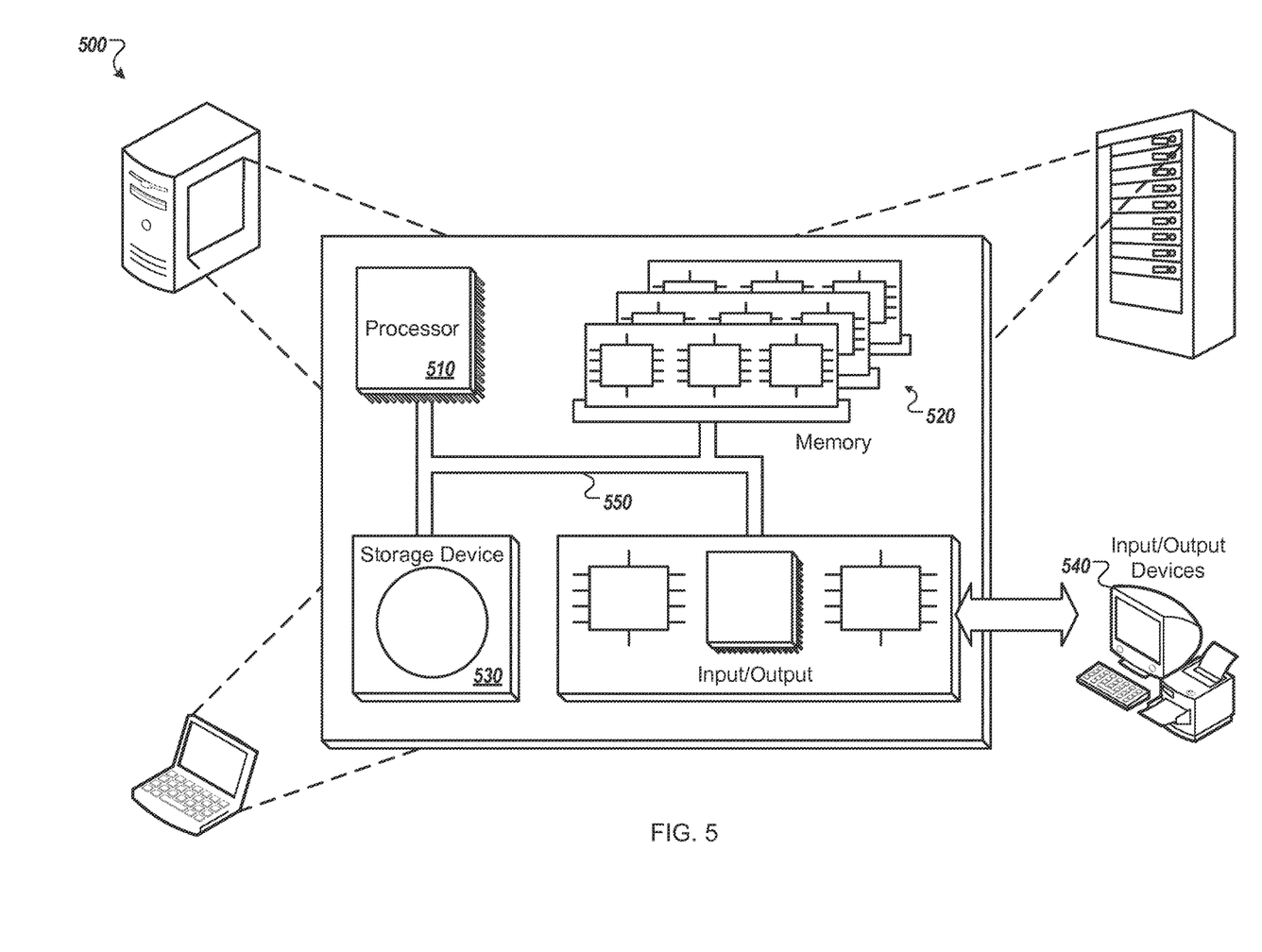
FIG. 5 is a schematic diagram that shows an example of a computing system that can be used in connection with computer-implemented methods and systems described in this document.

FIG. 4 is a flowchart of an example of a process 400 for executing native code. For convenience the process 400 will be described as being performed by a system including one or more computing devices, for example the computer system 200. Therefore, the description that follows uses the computer system 200 as the basis of an example describing the system for clarity of presentation. However, another system, or combination of systems, can be used to perform the process 400.

The system executes, on a processor, an application's computer-specific commands in an operating system's execution environment (402). For example, a computer (e.g. computer system 200) can execute an application (e.g. email application 208, text editor 210, or browser 212) in an execution environment (e.g. execution environment 206). The application may include commands that are specific to the hardware of the computer (e.g. processor 202) and/or the software of the computer (e.g. operating system 204). In some implementations, the applications have been written in a programming language, compiled by a computer-specific compiler into a series of binary machine instructions, and executed.

The system interprets a scripted module in a scripting environment of a browser (404). For example, a web-browser (e.g. browser 212) can create one or more environments (e.g. scripting environment 214) for interpreting scripted modules (e.g. scripted modules 216). The web-browser can interpret scripted modules by parsing the commands of the scripted modules and performing the actions called for by the commands. In some implementations, the scripted modules have been written in a scripting language that is not computer-specific. That is, the scripted modules may be interpreted by any system that provides a scripting environment that meets the requirements of the scripting language. As such, the same scripting module may be used across a wide variety of systems to provide the same functionality.

The system executes, on the processor, a native module's computer-specific commands in the web-browser's native environment (406). For example, a web-browser (212) can create one or more environments (e.g. native environment 218) for executing native modules (e.g. native modules 220). The native module may include commands that are specific to the hardware of the computer (e.g. processor 202) and/or the software of the computer (e.g. operating system 204). In some implementations, the applications have been written in a programming language, compiled by a computer-specific compiler into a series of binary machine instructions, and executed.

Compared to the applications executing in the execution environment, the native modules in the native environment may only be permitted to access a subset of the computer-specific commands of the system. The web-browser and/or the native environment may have one or more security policies or other mechanism in place to limit the impact of the native module on the operating system or the system as a whole. These limits may be tied to the permitted and expected functionality of the native modules. For example, the designers of the native environment may determine that no reasonable use of a native module includes accessing a hard drive. In this case, the native environment would prevent any attempts by a native module to access a hard drive. In some cases, the limited functionalities are those that could affect the computer system outside of the native environment. For example, computer-specific commands to perform calculations on the processor may always be permitted by the native module.

The system asynchronously passes, from one of the scripting environment and the native environment, a data object by value from the other of the scripting environment and the native environment (408). For example, the web-browser (e.g. interface 222) may receive data objects from a module (e.g. scripted module 216, native module 220) in one environment (e.g. scripting environment 214, native environment 218) and may pass the data object to a module in the other environment.

The web-browser may pass these data objects by value. That is, when a module sends a data object, the web-browser creates copy of the data object and passes the copy to the receiving module. As such, two independent copies of the data object will exist. Each module may edit or delete their copy without affecting the copy held by the other module.

The web-browser passes these data objects asynchronously. That is, the sending module may not need to wait for the receiving module to accept the data object before beginning on another task. One scheme for asynchronously passing the data objects includes temporarily storing the data object while in transit. The web-browser may create a data storage structure to temporarily hold the data object until the receiving module is prepared to accept it. In this case, it is the web-browser's data storage structure, or a process thereof, that must wait for the receiving module to accept the data object before beginning on another task.

Some configurations for asynchronously passing by value include the system receiving, from one of the scripting environment and the native environment, the data object. The system then stores the data object in a library (e.g. library 304) in association with an index. This library may take the form of any suitable data repository such as a hash table or array. The format of the library index may depend on the format of the library. For example, for a hash table library, the library index may take the form of the hash of the data object. For an array library, the library index may take the form of an array index.

The system provides, to the other of the scripting environment and the native environment, the index. The system may provide this index directly to the receiving module. For example, when the sending module sends the data object to the library, the sending module may specify one or more modules to receive the library index. In this case, the web-browser may pass the library index to those specified modules. In another example, the web-browser may return the library index to the sending module. The sending module may then send the library index to any other module, and the other modules may retrieve the data object from the library with the library index.

Some configurations for asynchronously passing by value include the system receiving, from one of the scripting environment and the native environment, a reference to a memory location containing a data object. The system then creates a copy of the data object in a second memory location. The system then provides, to the other of the scripting environment and the native environment, a reference to the second memory location. For example, the web-browser may create the copy of the data object in a memory buffer of the environment of the receiving module and may provide a reference of the data object to the receiving module. In another example, the web-browser may create the copy of the data object in a memory location that is not available to the receiving module. When the receiving module is ready to receive the data object, the web-browser can move the data object to the receiving environment's memory buffer and pass a reference to the new location to the receiving module.

Some configurations for asynchronously passing by value include the system receiving, from one of the scripting environment and the native environment, a data object. The system stores the data object until the data object is requested, and then the system provides, to the other of the scripting environment and the native environment, the data object responsive to a request for the data object from the other of the scripting environment and the native environment. For example, the web-browser may create the copy of the data object in a memory location that is not available to the receiving module. When the receiving module is ready to receive the data object, the web-browser can provide the data object to the module. The module may then store the data object in a memory buffer or perform any other appropriate operation on the data object.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computing system comprising:
a processor; and
a machine-readable storage device having instructions stored thereon that, when executed by the processor, cause the processor to generate a web browser that includes:
a scripting environment that is created by the web browser and that includes a first memory buffer, the scripting environment configured to:
(i) interpret a scripted application module, and
(ii) store a first data object in the first memory buffer for use by the scripted application module;
a native environment that is created by the web browser and that includes a sandbox and a second memory buffer, the sandbox being configured to restrict a native application module from accessing one or more resources of the computing system or form executing one or more computer-specific commands, the native environment configured to:
(i) execute the native application module in the sandbox, and
(ii) store a second data object in the second memory buffer for use by the native application module; and
an interface between the scripted environment and the native environment that is created by the web browser and that is accessible to the scripted application module and to the native application module while the native application module is executed in the sandbox, wherein the interface includes a storage queue, the interface configured to:
(i) pass a copy of the first data object from the scripting environment to the native environment by placing the copy of the first data object in the storage queue to make the copy of the first data object available to the native application module being executed in the sandbox, and
(ii) asynchronously pass a copy of the second data object from the native environment to the scripting environment by placing the copy of the second data object in the storage queue to make the copy of the second data object available to the scripting application module in the sand box.

2. The computing system of claim 1, wherein:
the scripting environment is configured to interpret the scripted application module in a first process on the computing system,
the native environment is configured to execute the native application module in a second process on the computing system that is separate from the first process, and
the interface is configured to pass data objects between the scripted application module that is being interpreted in the first process and the native application module that is being executed in the second process.

3. The computing system of claim 1, wherein:
the scripted application module is configured to serialize the first data object by transforming the first data object into an ordered bitstream, a string, or a common data format, so as to prepare the first data object to be passed to the native environment via the interface, or
the native application module is configured to serialize the second data object by transforming the second data object into an ordered bitstream, a string, or a common data format, so as to prepare the second data object to be passed to the scripting environment via the interface.

4. The computing system of claim 1, wherein:
the instructions stored on the machine-readable storage device, when executed by the processor, are further configured to generate a library module that is external to the native environment and the scripting environment, the library module configured to:
receive a third data object from the native application module,
store the third data object in a memory of the library module, and
return a library index value for the third data object to the native application module in response to receiving and storing the third data object;
wherein the interface is further configured to share the third data object with the scripted application module by passing the library index value for the third data object from the native application module to the scripted application module.

5. The computing system of claim 1, wherein the computer-specific commands are processor-specific commands.

6. The computing system of claim 1, wherein the interface is further configured to pass the copy of the first data object from the scripting environment to the native environment by:
receiving, by the interface and from the scripted application module, a reference to the first data object that indicates a location of the first data object within the first memory buffer of the scripting environment;
in response to receiving the reference to the first data object, accessing the first data object from the first memory buffer of the scripting environment and storing the copy of the first data object in the storage queue of the interface;
receiving, by the interface and from the native application module, a data object request; and
in response to receiving the data object request from the scripted application module, providing the copy of the first data object from the storage queue of the interface to the native application module in the native environment.

7. The computing system of claim 6, wherein the interface is further configured, in response to receiving the reference to the first data object from the scripting application module, to send an alert to the native application module that indicates the copy of the first data object is available for the native application module to retrieve.

8. The computing system of claim 1, wherein the interface is further configured to pass the copy of the first data object from the scripting environment to the native environment by:
receiving, by the interface and from the scripted application module, a reference to the first data object that indicates a location of the first data object within the first memory buffer of the scripting environment;
in response to receiving the reference to the first data object, storing the reference to the first data object in the storage queue of the interface;
receiving, by the interface and from the native application module, a data object request; and
in response to receiving the data object request from the scripted application module,
(i) using the reference to the first data object that was stored in the storage queue of the interface to access the first data object from the first memory buffer of the scripting environment, and
(ii) providing a copy of the first data object to the native application module in the native environment.

9. The computing system of claim 1, wherein the interface is configured to:
asynchronously pass the copy of the first data object from the scripting environment to the native environment by storing the copy of the first data object in the storage queue of the interface before the native application module is prepared to receive the copy of the first data object, or
asynchronously pass the copy of the second data object from the native environment to the scripting environment by storing the copy of the second data object in the storage queue of the interface before the scripted application module is prepared to receive the copy of the second data object.

10. The computing system of claim 1, wherein:
the scripting environment is configured to interpret multiple scripted application modules, and
the interface includes at least (i) a first queue that is configured to store data objects for use by a first scripted application module of the multiple scripted application modules and (ii) a second queue that is configured to store data objects for use by a second scripted application module of the multiple scripted application modules.

11. The computing system of claim 1, wherein:
the computing system is a user computing device that includes a web browsing application; and
the scripting environment, the native environment, and the interface are all generated by the web browsing application.

12. The computing system of claim 1, wherein the scripted application module, the interface, and the native application module are related components of the web browser, wherein the scripted application module and the native application module are configured to interact with each other through the interface during the web brower's runtime.

13. The computing system of claim 1, wherein the storage queue of the interface comprises a queue that is configured to store data objects in a specified order.

14. A method performed by a computing system, comprising:
generating a web browser wherein the web browser creates
(i) a scripted environment;
(ii) a native environment; and
(iii) an interface between the scripted environment and the native environment that is accessible to the environments, wherein the interface includes a storage queue;
identifying, for a web browser on the computing system, a scripted application module and a native application module, wherein
the scripted application module is configured to interact with the native application module in the web browser on the computing system, and
the native application module is configured to interact with the scripted application module in the web browser on the computing system;
interpreting the scripted application module in the scripting environment of the web browser;
storing a first data object in a first memory buffer in the scripting environment for use by the scripted application module;
executing the native application module in a sandbox of the native environment of the web-browser, wherein the sandbox restricts the native application module from accessing particular resources of the computing system and restricts the native application module from executing particular commands;
storing a second data object in a second memory buffer in the native environment for use by the native application module; and
using the interface of the web browser, while the native application module is executed in the sandbox, to perform the steps of:
passing a copy of the first data object from the scripting environment to the native environment by placing the copy of the first data object in a storage queue of the interface to make the copy of the first data object available to the native application module being executed in the sandbox, and asynchronously passing a copy of the second data object from the native environment to the scripting environment by placing the copy of the second data object in the storage queue to make the copy of the second data object available to the scripting application module in the sandbox.

15. The method of claim 14, further comprising:
receiving, by the interface and from the scripted application module, a reference to the first data object that indicates a location of the first data object within the first memory buffer of the scripting environment;
obtaining, by the interface and in response to receiving the reference to the first data object, the first data object from the first memory buffer of the scripting environment;
storing a copy of the first data object in the storage queue of the interface;
receiving, by the interface and from the native application module, a data object request; and
in response to receiving the data object request from the scripted application module, providing the copy of the first data object from the storage queue of the interface to the native application module in the native environment.

16. The method of claim 14, further comprising:
receiving, by the interface and from the scripted application module, a reference to the first data object that indicates a location of the first data object within the first memory buffer of the scripting environment;
in response to receiving the reference to the first data object, storing the reference to the first data object in the storage queue of the interface;
receiving, by the interface and from the native application module, a data object request; and
in response to receiving the data object request from the scripted application module,
    (i) using the reference to the first data object that was stored in the storage queue of the interface to access the first data object from the first memory buffer of the scripting environment, and
    (ii) providing a copy of the first data object to the native application module in the native environment.

17. One or more non-transitory computer-readable storage devices having instructions stored thereon that, when executed by one or more processors of a computing system, cause the one or more processors to perform operations comprising:
generating a web browser wherein the web browser creates (i) a scripted environment; (ii) a native environment; and (iii) an interface between the scripted environment and the native environment that is accessible to the environments, wherein the interface includes a storage queue;
identifying, for a web browser on the computing system, a scripted application module and a native application module, wherein:
    the scripted application module is configured to interact with the native application module in the web browser on the computing system, and
    the native application module is configured to interact with the scripted application module in the web browser on the computing system;
interpreting the scripted application module in the scripting environment of the web browser;
storing a first data object in a first memory buffer in the scripting environment for use by the scripted application module;
executing the native application module in a sandbox of a native environment of the web browser, wherein the sandbox is configured to restrict the native application module from accessing particular resources of the computing system and to restrict the native application module from executing particular commands;
storing a second data object in a second memory buffer in the native environment for use by the native application module; and
using an interface of the web browser, while the native application module is executed in the sandbox, to perform the steps of:
    passing a copy of the first data object from the scripting environment to the native environment by placing the copy of the first data object in a storage queue of the interface to make the copy of the first data object available to the native application module being executed in the sandbox, and
    asynchronously passing a copy of the second data object from the native environment to the scripting environment by placing the copy of the second data object in the storage queue to make the copy of the second data object available to the scripting application module in the sand box.

18. The one or more non-transitory computer-readable storage devices of claim 17, wherein the operations further comprise:
receiving, by the interface and from the scripted application module, a reference to the first data object that indicates a location of the first data object within the first memory buffer of the scripting environment;
obtaining, by the interface and in response to receiving the reference to the first data object, the first data object from the first memory buffer of the scripting environment;
storing a copy of the first data object in the storage queue of the interface;
receiving, by the interface and from the native application module, a data object request; and
in response to receiving the data object request from the scripted application module, providing the copy of the first data object from the storage queue of the interface to the native application module in the native environment.

19. The one or more non-transitory computer-readable storage devices of claim 17, wherein the operations further comprise:
receiving, by the interface and from the scripted application module, a reference to the first data object that indicates a location of the first data object within the first memory buffer of the scripting environment;
in response to receiving the reference to the first data object, storing the reference to the first data object in the storage queue of the interface;
receiving, by the interface and from the native application module, a data object request; and
in response to receiving the data object request from the scripted application module,
    (i) using the reference to the first data object that was stored in the storage queue of the interface to access the first data object from the first memory buffer of the scripting environment, and
    (ii) providing a copy of the first data object to the native application module in the native environment.

* * * * *